(12) United States Patent
Chen

(10) Patent No.: US 6,574,041 B1
(45) Date of Patent: Jun. 3, 2003

(54) PROJECTION SCREEN AND PROJECTION METHOD

(75) Inventor: Shane Chen, Camas, WA (US)

(73) Assignee: CID, Inc., Camas, WA (US)

( * ) Notice: Subject to any disclaimer, the term of this patent is extended or adjusted under 35 U.S.C. 154(b) by 16 days.

(21) Appl. No.: 09/638,530

(22) Filed: Aug. 14, 2000

(51) Int. Cl.$^7$ .................. G03B 21/56; G03B 21/60
(52) U.S. Cl. ................ 359/459; 359/457; 359/449
(58) Field of Search .................. 359/459, 443, 359/457, 742, 743, 449, 455, 619

(56) References Cited

U.S. PATENT DOCUMENTS

| | | | |
|---|---|---|---|
| 3,510,197 A | 5/1970 | Seki et al. ................ 359/461 |
| 3,580,661 A | 5/1971 | Cooper ................ 359/457 |
| 3,784,742 A | 1/1974 | Burnham et al. ........... 348/123 |
| 3,964,822 A | * 6/1976 | Yamashita ................ 359/443 |
| 4,089,587 A | 5/1978 | Schudel ................ 359/451 |
| 4,732,441 A | 3/1988 | Cheng ................ 359/451 |
| 4,756,603 A | 7/1988 | Ohtani ................ 359/601 |
| 4,911,529 A | 3/1990 | Van De Ven ............ 359/454 |
| 5,206,760 A | * 4/1993 | Nakashima et al. ........ 359/457 |
| 5,337,179 A | 8/1994 | Hodges ................ 359/443 |
| 5,414,558 A | 5/1995 | You ................ 359/451 |
| 5,456,967 A | 10/1995 | Nezu ................ 428/141 |
| 5,541,769 A | 7/1996 | Ansley et al. ............ 359/451 |
| 5,696,625 A | 12/1997 | Malifaud et al. ........... 359/459 |
| 5,837,346 A | 11/1998 | Langille et al. ............ 428/141 |
| 6,023,369 A | * 2/2000 | Goto ................ 359/443 |

* cited by examiner

*Primary Examiner*—Christopher Mahoney
*Assistant Examiner*—Magda Cruz
(74) *Attorney, Agent, or Firm*—Chernoff, Vilhauer, McClung & Stenzel, LLP

(57) ABSTRACT

A reflective projection screen comprising multiple horizontal row segments facilitates directing a reflected image to provide a wide horizontal viewing angle within a relatively narrow vertical viewing band. Each horizontal row segment has a surface that distributes incident light over a wide horizontal angle. The vertical inclination of each row segment is varied from the top to the bottom of the screen to direct the light vertically.

10 Claims, 5 Drawing Sheets

PROJECTION SCREEN AND PROJECTION METHOD

BACKGROUND OF THE INVENTION

The present invention relates to a projection screen and a projection system and method and, more particularly, to a front projection screen and a projection method providing horizontal diffusion and vertical direction of projected light to minimize the effects of ambient light.

Audio-visual presentations are important parts of trade shows and other exhibitions. Viewers at exhibit booths are likely to stand in an arc around the front of the exhibit, some distance from a front projection screen on which images are projected. An effective presentation requires a reflected image of high intensity and good contrast. In many exhibition venues light from overhead lighting impinges on the projection screen reducing the contrast or "washing out" the projected images. Directing the light of the reflected image in a relatively narrow vertical band increases the intensity in the region of the viewers' eyes. On the other hand, the arrangement of viewers requires that light be reflected over a substantial horizontal angle.

Generally, front projection screens are either reflective, light scattering, or refractive. The surface of light scattering screens scatters the incident light in all directions rather than reflecting it at a discrete angle. Light scattering projection screens provide a wide viewing angle both horizontally and vertically but the gain of the screen is low and images are visible only under dim lighting conditions. Refractive screens are coated with tiny glass balls and light projected at an angle to the screen is returned along the path of incidence. Refractive screens are particularly useful when the projector is positioned low relative to the screen because the light is returned along the path of incidence toward a seated audience. However, glass beaded screens can be delicate and can exhibit a granular appearance because the glass beads are of sufficient size to cause disturbing refraction involving individual picture elements. Further, the luminance provided by a refractive screen decreases substantially from the center to the edges both horizontally and vertically and the homogenous nature of the glass beads does not allow a focusing difference in the horizontal and vertical planes.

Reflective screens have surfaces exhibiting behavior governed primarily by the law of reflection; that is, the angle of incidence of light equals the angle of reflection. This type of screen provides greater gain than is available with light scattering screens and, therefore, better visibility in areas of more intense ambient light. However, the viewing angle of a planar reflective screen is narrower than that of a diffusing screen so the viewer can clearly see images only within a limited arc in front of the screen. Reflective screens commonly have a surface combining reflection and limited diffusion. Light is reflected from this type of surface in a solid angle along the nominal angle of reflection.

The physical arrangement of the projector and screen can be problematic when using front projection in an exhibit. Front projectors are seldom placed normal to the screen because the projector would obstruct the field of view of the audience. A front projector is typically located above the heads of the audience and a reflective screen is used to redirect the light to the eyes of the viewers. However, mounting the projector overhead is often not practical in a trade show or exhibit booth. Positioning the projector low relative to the screen reduces obstruction to viewing the screen, but a screen that reflects the image upward to the eyes of the audience is particularly vulnerable to glare and wash out from overhead lighting.

A front projection screen comprising multiple reflective screen elements arranged in vertical columns is disclosed in Malifaud et al., U.S. Pat. No. 5,696,625. The screen elements have either a toroidal or a cylindrical reflective surface. The curvatures of the reflective surfaces of the individual screen elements can be varied to directionally focus an image. However, focusing the reflected light by altering the curvature of individual screen elements results in a complex screen assembly. Further, the screen is adapted for use in a darkened theater setting with a projector mounted above the screen.

What is desired, therefore, is a front projection screen that provides for directional focusing of an image, protection from glare and wash out by overhead lighting, and permits the projector to be positioned near the bottom of the screen out of the line of sight of viewers.

BRIEF SUMMARY OF THE INVENTION

The present invention overcomes the aforementioned drawbacks of the prior art by providing a projection screen for reflecting an image from a projector to a viewer comprising a screen defining a horizontal direction and a vertical direction and having a top and a bottom. A plurality of substantially horizontal reflective row segments are disposed on the surface, each row segment having a surface for distributing and/or diffusing light over a wide horizontal area and each row segment defining a respective angle of inclination with respect to the vertical direction, wherein the respective angle of inclination of each row segment varies from the top of the screen to the bottom of the screen. The respective angle of inclination is greater at the top of the screen than the respective angle of inclination at the bottom of the screen, so that the screen reflects light from a projector located below the center of the screen toward a viewer while directing ambient light originating from above the center of the screen away from the viewer. The respective surfaces of the horizontal row segments distribute the projected image over a large angle in the horizontal direction to make the image viewable to an audience arrayed in front of the screen. On the other hand, the varying vertical inclination of the row segments facilitates directing the image in a relatively narrow vision band in the vicinity of the viewers' eyes.

The novel screen makes possible a unique system and method of projecting an image comprising locating a projector below a sight line of a viewer of the image, projecting the image on a projection screen, and reflecting the image at an angle varying from the bottom of the screen to the top of the screen. The screen is designed to maximize the amount of light reflected from a projector located below the lines of sight of the audience, and to minimize the reflection of ambient light. In general, the sources of ambient light in a viewing area, such as at a trade show or in a conference room, are located toward the side of the screen (for example from windows) or above the screen (for example from overhead lighting). The screen directs the ambient light away from the viewer, thereby maximizing image contrast. The screen of the present invention thus provides high contrast viewing even in bright ambient lighting conditions.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
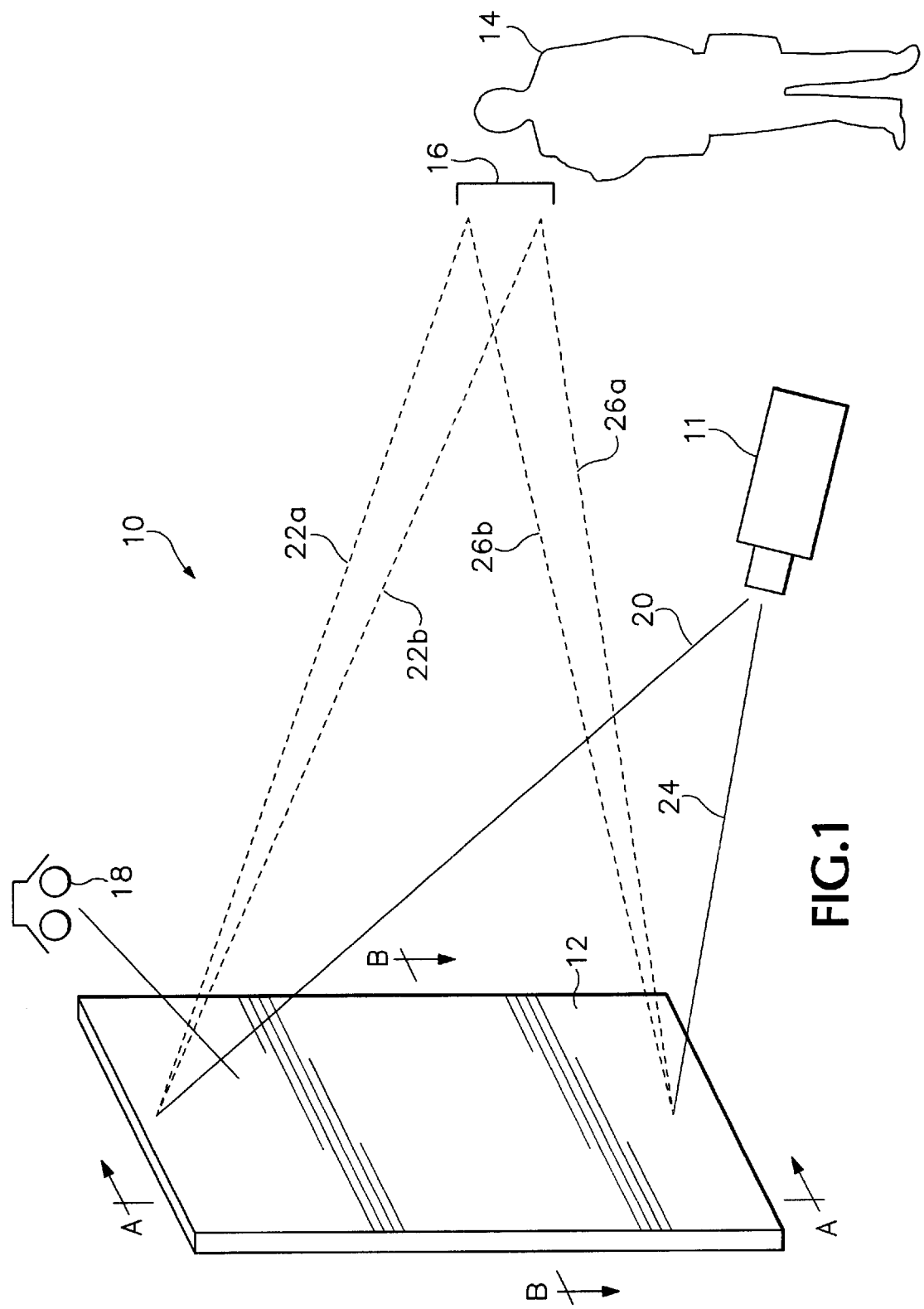
FIG. 1 is a schematic perspective representation of a projection system.

Referring to FIG. 1, in a system 10, a front projection presentation light from a projector 11 is reflected from a projection screen 12 to viewers 14 arrayed in front of the screen. At a typical trade show exhibit booth or conference room, the audience 14 is often sitting or standing and arrayed in a wide horizontal area around the front of the booth. With the audience arrayed in an area around the viewing area, a large horizontal viewing angle is desirable. However, in the vertical plane, the reflected light should be focused in a fairly narrow viewing band 16 (indicated by a bracket) to maximize the intensity of the light in the area of the eyes of the audience 14. On the other hand, the effects of ambient light from sources such as overhead lights 18 should be minimized. Ambient lighting striking the screen reduces the contrast and can "wash out" the projected image. In many venues overhead lighting 18 is the principal source of ambient light. Nevertheless, other sources of ambient lighting, such as from windows in a conference room, should also be minimized.

The present inventor realized that a projection screen comprising a plurality of horizontal row segments permitting horizontal distribution of the light over a wide area and narrow distribution of the light in a vertical direction could be used with a projector located below the center line of the screen to minimize the effects of ambient lighting and provide high contrast images. Few, if any, sources of ambient light are located at positions located vertically below the center of a projection screen. The present inventor discovered that by placing a projector below the center line of the screen, such as on a table or on the floor, the projector would be located at a point from which very little ambient light originated. The projection screen 12 is therefore designed to direct the light in a vertical direction so as to maximize reflection from light originating from a point located vertically below the center of the screen. This has the effect of minimizing reflection from ambient light sources located at the side of or above the screen 12; that is, from ambient light sources located vertically at or above the center of the screen.

Figure 2:
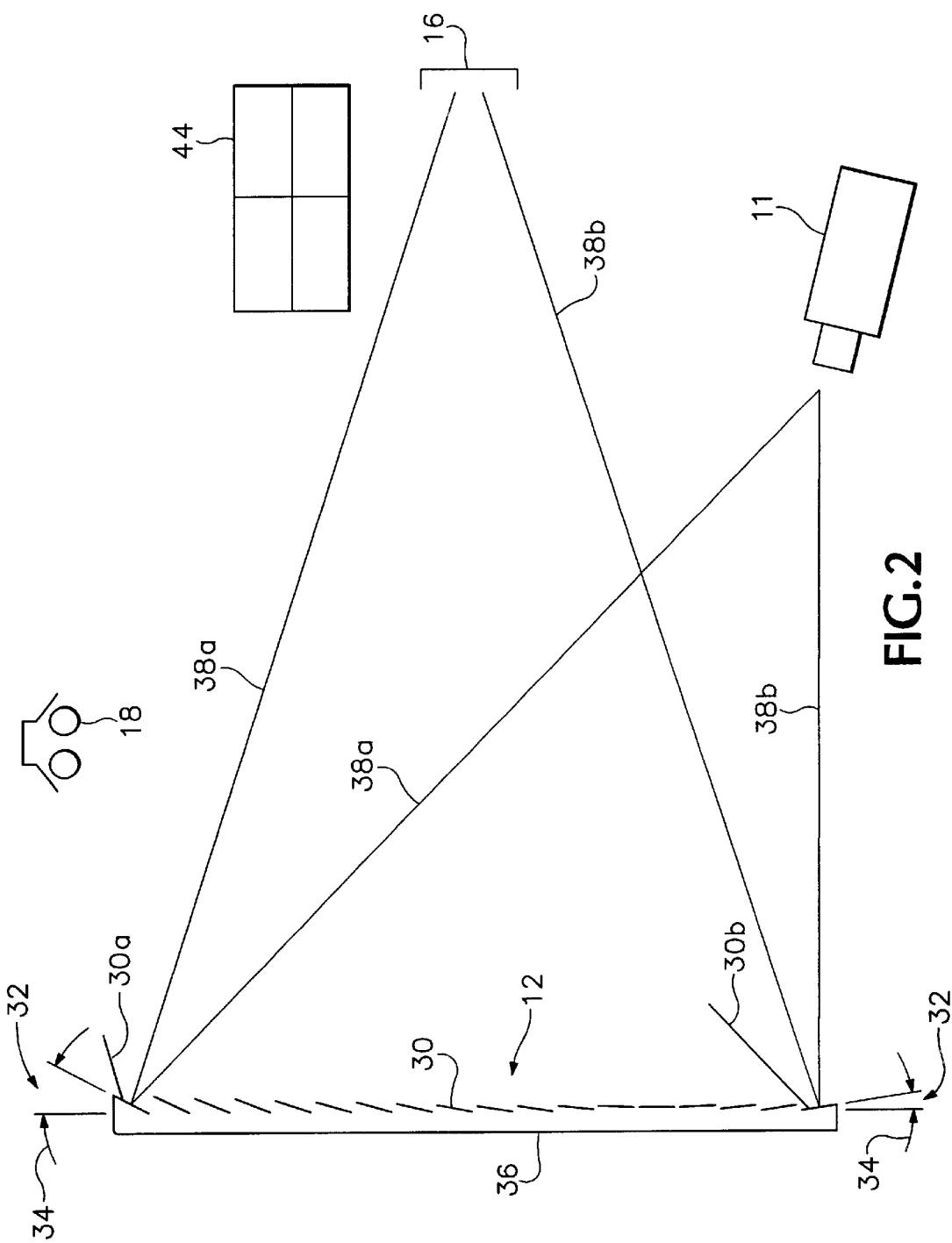
FIG. 2 is a schematic representation of a side elevation of a projection system.
Figure 3:
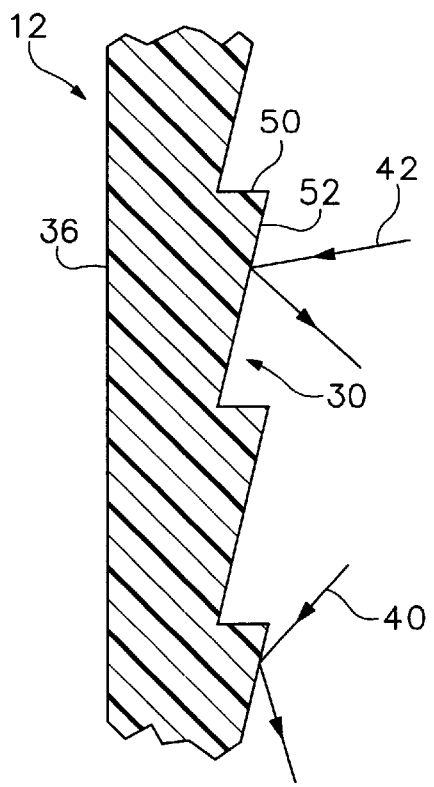
FIG. 3 is a portion of a vertical cross-section of a first embodiment of a projection screen taken along line A—A of FIG. 1.

Referring now more particularly to FIG. 2, the screen 12 of the present invention comprises a substantially planar surface 36 on which is disposed a plurality of substantially horizontal reflective row segments 30. Each of the row segments 30 defines a vertical angle of inclination 32 with respect to the vertical direction 34. For example, where the screen has a flat rear surface 36 that is located in the vertical plane, the angle of inclination may be taken as the angle with respect to the rear surface 36. Referring to FIG. 3, in vertical cross-section the screen 12 has a saw tooth appearance resulting from the substantially horizontal upper surfaces 50 and inclined vertical surfaces 52 of the horizontal row segments 30. In one embodiment, the upper surface 50 may be coated with a light absorbing material to absorb unwanted ambient light.

The angle of inclination for each row segment 30 is chosen so as to direct the light originating from the projector (or from a light source located below the center line of the screen) toward the viewing band 16. Uniformly increasing the respective angle of inclination 32 of the row segments 30 over the vertical dimension of the screen 12 from the bottom of the screen to the top of the screen permits the reflected light to be directed in a vertical direction to maximize the intensity of the image at the level of the viewers 14. A greater respective vertical inclination angle 32 for a row segment 30a at the top of the screen facilitates directing the projected light 38a to the level of the viewing band 16. A lesser or even negative respective vertical angle of inclination 32 for a row segment 30b in a lower region of the screen permits directing the projected light 38b toward the viewing band 16 even if the bottom of the screen 12 is below the eye level of the viewer.

In one exemplary system, the angle of inclination for segments at the top of the screen is about 19°, while the angle of inclination at the bottom of the screen is about −3°, with the angle of inclination increasing uniformly from the bottom of the screen toward the top of the screen. Using such a system, a projector located at floor level may project upward at a 6° angle toward a 6 foot high screen located about 14 feet away and mounted about 2 feet above the floor. Because the projector is projecting an image upwardly, it is preferred to use a digital projector having keystone correction.

By varying the angle of inclination 32 in this manner, it may be seen that ambient light originating from sources located at or above the center of the screen 12 is directed away from the viewing band 16. For example, referring to FIGS. 2 and 3, light 40 from overhead light source 18 is directed in a direction toward the floor. Ambient light 42 originating from a source such as a window 44 located near the level of the viewer is directed back toward the projector. The construction of the screen 12 thus reflects ambient light away from the viewing band 16, thereby maximizing the contrast of the projected image.

The size and number of row segments 30 depends on the size of the screen and resolution of the projected image. Where a digital image is projected, it is desired to have more segments than pixel elements. Preferably, the number of row segments 30 is twice the number of pixel elements. For example, where the projected image has 768 vertical pixel elements, it is desired to provide at least 1536 row elements to produce a pleasing reflected image. Thus, for a 100 inch high screen, this results in a height for each row of about $\frac{1}{16}$ inch (0.065 inches).

While a reflective surface provides high gain, limited diffusion of the reflected light may be desirable to provide uniformity of image brightness over the screen area. As a result, the row segment 30 may provide for diffusion of the reflected light in a limited solid angle around the specular direction of reflection. As illustrated in FIG. 1, light 20 incident to the top of the screen 12 is reflected to the vision zone 16 along lines 22a and 22b. Likewise, light incident to a lower region of the screen 24 is reflected to the vision zone 16 along reflection lines 26a and 26b representing the limited diffusion of light along the nominal direction of reflection. The system provides the further advantage of minimizing visual obstruction by locating the projector 11 out of the lines of sight of viewers 14. Locating the projector 11 below the line of sight is often necessary at trade show booths because the structure of a booth may not be sufficient for mounting the projector above the audience 14.

Figure 4:
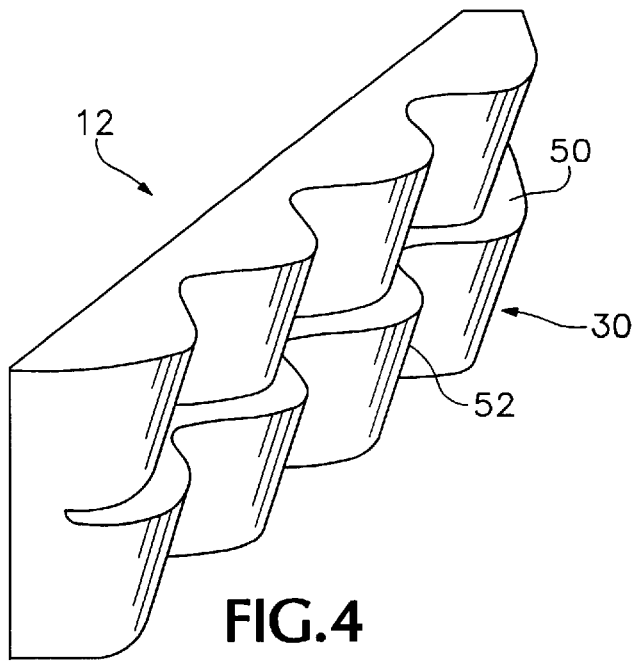
FIG. 4 is a perspective view of a section of a front surface of a projection screen having row segments including a curved surface of sinusoidal cross-section.
Figure 5A:
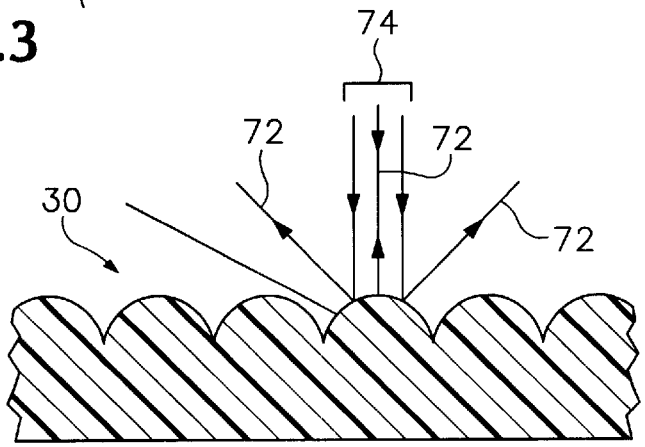
FIG. 5A is a portion of a horizontal cross-section of an alternative projection screen having row segments with a cross-section comprising adjacent circular arcs taken in direction B—B of FIG. 1.
Figure 5B:
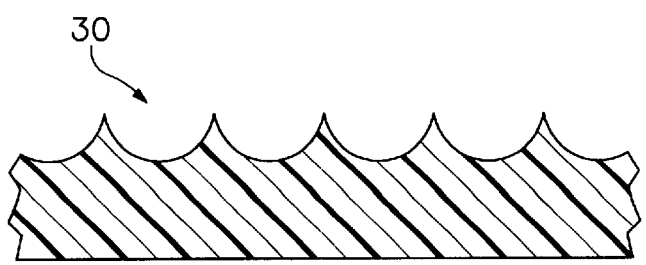
FIG. 5B is a portion of a horizontal cross-section of yet another alternative projection screen having row segments with a cross-section comprising adjacent circular arcs taken in direction B—B of FIG. 1.

Horizontal distribution of light may be provided in a number of ways. By horizontal distribution is meant that the light reflected by the screen 12 is distributed or diffused over a wide horizontal viewing angle. Preferably, the screen for any area smaller than the resolution of the projected image distributes the reflected light over a horizontal angle approaching 180°. In a first embodiment illustrated in FIGS. 3–4, each row segment 30 includes an upper surface 50 substantially normal to the plane of the screen 12 and a uniform repeating optical pattern on surface 52 oriented at the angle of inclination 32 to the screen 12. The inclined surfaces 52 of the horizontal row segments 30 comprise a uniform repeating optical pattern that distributes light widely over a horizontal direction. The inclined surface 52 of the screen element is nominally reflective and light striking the inclined surface 52 of a screen element 30 is reflected at an angle generally equal to the angle of incidence. When "rays" of incident light (indicated by a bracket) are reflected by the curved vertical face of the row segment, the light is distributed over a substantial horizontal angle. This is illustrated for an alternative embodiment shown in FIG. 5A, in which the "rays" of incident light 74 (indicated by a bracket) are reflected 72 by the curved vertical face 52 of the row segment 30, the light is distributed over a substantial horizontal angle. As a result, images projected on a screen 12 can be viewed by persons standing in a wide horizontal area in front of the screen. Three useful surface curvatures for the repeating optical patterns of the vertical faces 52 of the row segments 30 are a plurality of substantially adjacent circular arcs as illustrated in cross-section in FIGS. 5A and 5B and a substantially sinusoidal cross-section as illustrated in FIG. 4. The use of any of these surfaces will result in the horizontal distribution of light over a wide horizontal viewing angle.

Figure 6:
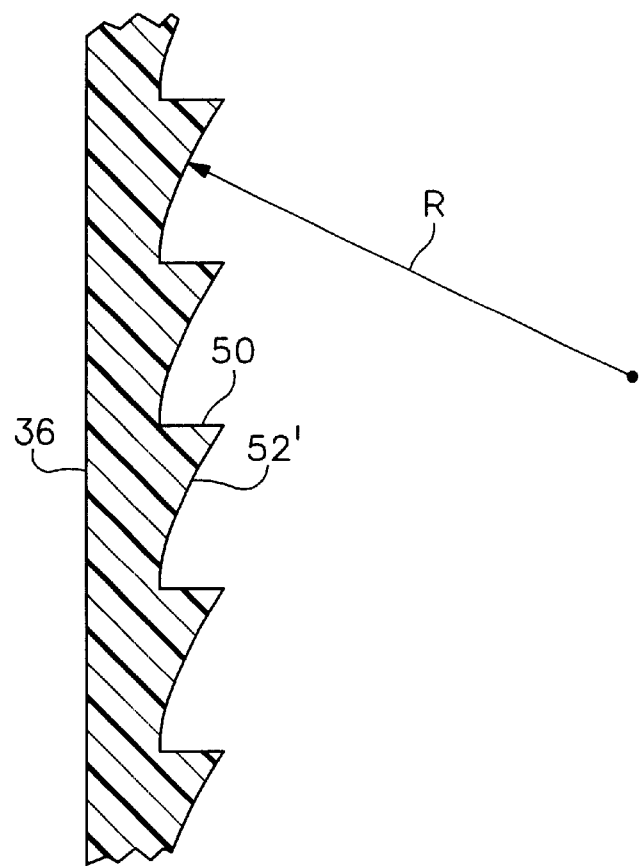
FIG. 6 is a portion of a vertical cross-section of a second embodiment of a front projection screen taken along line A—A of FIG. 1.
Figure 7A:
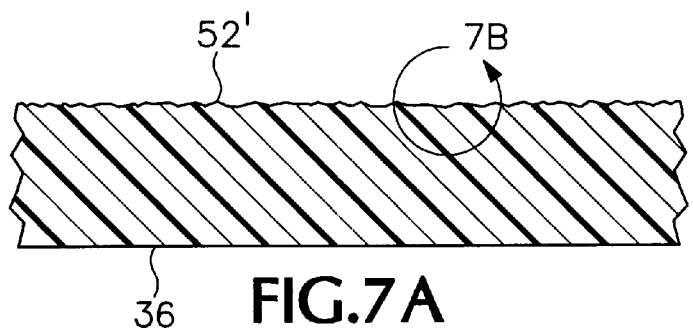
FIG. 7A is a portion of a horizontal cross-section of the second embodiment.
Figure 7B:
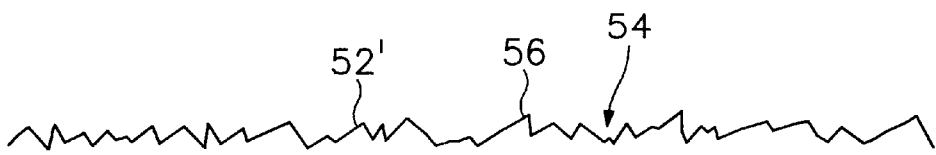
FIG. 7B is a detail view of FIG. 7A.

In another embodiment shown in FIGS. 6, 7A and 7B, the row segment 30 is formed by grinding the surface 52 in a vertical direction to produce a plurality of thin vertical grooves and ridges. FIG. 7A shows a horizontal cross section taken along the line B—B of FIG. 1, and FIG. 7B shows an exaggerated detail view. Very fine vertical grooves 54 and ridges 56 may be produced by grinding or cutting the material used to make the screen with a sandwheel or grinding wheel. The ridges and grooves are produced by grinding in a vertical direction the material used to form the screen. For example, where the screen is formed by pressing a die plate into a moldable material, the horizontal row segments may be formed by grinding the die plate. The resulting fine vertical grooves 54 and ridges 56 diffuse the light in the horizontal direction over a wide area. However, the grooves 54 and ridges 56 reflect light in a narrow vertical direction.

In yet another aspect of the invention, the inclined surfaces 52 may be curved in order to focus the light into a smaller vertical viewing band. For example, the embodiment of FIGS. 6, 7A and 7B provides a further advantage where the grooves are produced using a grinding wheel. As shown in FIG. 6, the segments 30 each have a curved inclined surface 52'. The curvature of the surface 52' is equal to the radius of curvature R of the grinding wheel. The distribution of light in the vertical direction may be further controlled by selecting an appropriate radius of curvature R to more narrowly direct the reflected light into a narrower viewing band 16. The angle of inclination 32 of such a surface 52' may be taken as the tangent line at the midpoint of the inclined surface 52'. Similarly, for row segments having cross-sections like those shown in FIGS. 4, 5A and 5B, the inclined surface may be formed so as to provide a curved surface for focusing the light in a vertical direction.

The screen 12 can be constructed in a variety of fashions. In one method, the screen 12 is formed by pressing a die plate into a moldable material. The optical pattern for the screen is formed in a material such as aluminum. A single sheet of aluminum may be machined, or alternatively, a plurality of horizontal segments, corresponding to the horizontal row segments, may be machined and fastened together, to produce the die plate. The screen pattern may be formed in the aluminum by milling or grinding. The aluminum is then hardened using an anodizing process. The die plate is then pressed into a moldable material, such as polyurethane, to produce a screen panel. Any plastic material that will take a mold image may be used. The resulting screen panel is then coated with a reflective material, such as depositing aluminum on the screen panel using a vacuum deposition process.

In an alternative method, the die plate is used to form a mold into which a liquid may be poured. The liquid is poured into the mold and allowed to cool and harden, resulting in a cast image of the screen pattern.

The screen 12 may be either made from a single panel or from multiple panels. The uniformity of the horizontal row segments 30 facilitates construction of the screen 12 from a plurality of smaller panels. The enhanced portability of the smaller screen panels is an important feature for screens used at trade shows and other temporary exhibitions. Such screen panels may be mounted to a portable frame.

Figure 8:
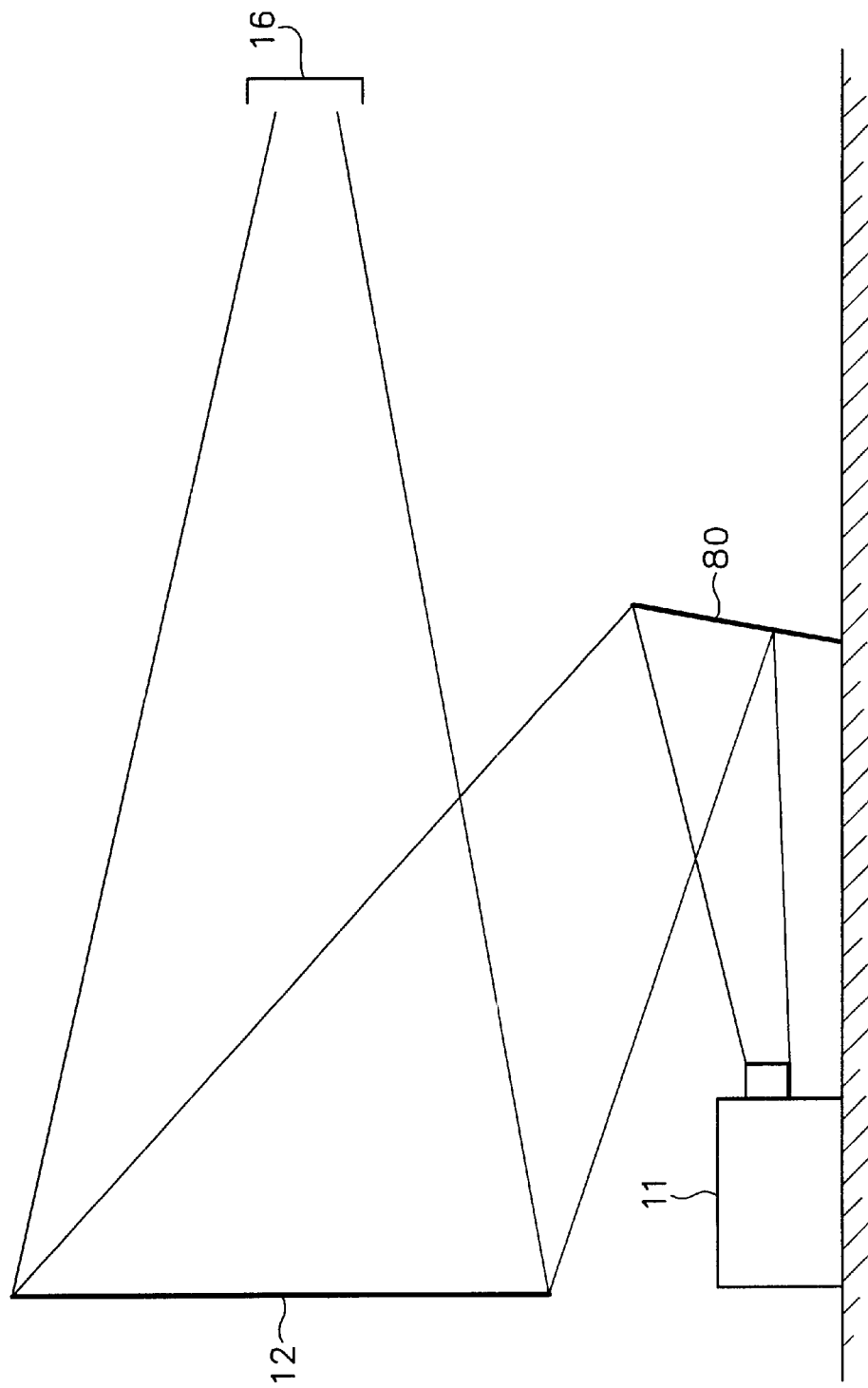
FIG. 8 is an alternative projection system.

As described above, the present system may be used in variety of environments where it is desired to project an image, such as at trade shows, conference rooms, theaters, etc. In an alternative embodiment shown in FIG. 8, a system is shown for use in an environment having the projector 11 located below the screen 12. A mirror 80 is used to reflect the image toward the screen 12.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A projection screen defining a horizontal direction and a vertical direction, comprising:

(a) a plurality of linear horizontally extending reflective row segments arranged to form a viewing screen facing an observer, each said row segment having a reflecting front viewing surface that distributes light in a wide horizontal direction;

(b) each row segment defining a respective vertical angel of inclination, wherein said respective angle of inclination of each row segment varies from the top of said screen to the bottom of said screen, said respective angle of inclination being greater at the top of said screen than the respective angle of inclination at the bottom of said screen, so that said screen reflects light from a source located below the center of the screen toward a viewing band in front of the screen while directing ambient light originating from, at or above the center of the screen away from the viewing band; and (c) a substantially flat rear surface.

2. The apparatus of claim 1 wherein said front viewing surface of each horizontal row segment has a uniform repeating optical pattern.

3. The apparatus of claim 2 wherein said repeating optical pattern has a cross-sectional shape substantially defined by a sinusoid.

4. The apparatus of claim 2 wherein said repeating optical pattern has a cross-sectional shape substantially defined by a plurality of adjacent circular arcs.

5. The apparatus of claim 1 wherein said reflecting front viewing surface comprises a plurality of vertical grooves and ridges.

6. The apparatus of claim 1 wherein said screen is substantially planar.

7. The apparatus of claim 6 wherein said grooves and ridges are formed by grinding a material used to form said screen.

8. The apparatus of claim 1 wherein said projection screen comprises a plurality of panels.

9. The apparatus of claim 1 wherein said screen is formed from a moldable material.

10. The apparatus of claim 1 further including a projector positioned below a centerline of said projection screen capable of projecting an image on the reflecting front viewing surface.

* * * * *